US007245766B2

(12) United States Patent  
Brown et al.

(10) Patent No.: US 7,245,766 B2
(45) Date of Patent: Jul. 17, 2007

(54) METHOD AND APPARATUS FOR DETERMINING A REGION IN AN IMAGE BASED ON A USER INPUT

(75) Inventors: Lisa M. Brown, Pleasantville, NY (US); Susan Crayne, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 11/151,058

(22) Filed: Jun. 13, 2005

(65) Prior Publication Data

US 2005/0232485 A1    Oct. 20, 2005

Related U.S. Application Data

(63) Continuation of application No. 09/564,905, filed on May 4, 2000, now abandoned.

(51) Int. Cl.
*G06K 9/48* (2006.01)
(52) U.S. Cl. ...................................... 382/199
(58) Field of Classification Search ............... 382/113, 382/117–118, 199, 169–172, 203, 205, 266, 382/274, 308, 256–259
See application file for complete search history.

(56) References Cited

U.S. PATENT DOCUMENTS 5,719,951 A * 2/1998 Shackleton et al. ......... 382/118
6,434,258 B2 * 8/2002 Wiens ........................ 382/113

OTHER PUBLICATIONS

Gudmundsson et al., "Edge Detection in Medical Images Using a Genetic Algorithm," IEEE Transactions on Medical Imaging, vol. 17, No. 3, Jun. 1998.
Cagnoni et al., "Interactive Segmentation of Multi-Dimensional Medical Data with Contour-Based Application of Genetic Algorithms," 1994 IEEE.
Pal et al., "A Review on Image Segmentation Techniques," Pattern Recognition, vol. 26, No. 9, pp. 1277-1294, 1993.
Kass et al., "Snakes: Active Contour Models," IEEE 1987.

(Continued)

*Primary Examiner*—Vikkram Bali
(74) *Attorney, Agent, or Firm*—Ryan, Mason & Lewis, LLP (57) ABSTRACT

Methods and apparatus are disclosed for identifying a particular region in an image based on a user specification and information in the image, such as color and texture information. Initially, the user specifies a region using a single closed contour. The user input specifies the region of interest in the image. The present invention thereafter identifies a region that is (i) near the user input; (ii) about the same size as the initial region; (iii) the most likely boundary based on proximity to the initial boundary, region dissimilarity across the boundary, and similarity in region change along the boundary; and (iv) includes all points of homogeneous sub-regions that are initially mostly included. The present invention identifies the region accurately segmented and appropriately measured. By using local color information, edge information, and the user input, the present invention is capable of segmenting extremely complex regions including regions with highly irregular contours and regions composed of several visually different sub-regions or textures, or both.

36 Claims, 7 Drawing Sheets

OTHER PUBLICATIONS

Zhu et al., "Region Competition: Unifying Snakes, Region Growing, and Bayes/MDL for Multiband Image Segmentation," IEEE Transactions on Pattern Analysis and Machine Intelligence, vol. 18, No. 9, Sep. 1996.

Etoh et al., "Active Contour Extraction Based on Region Descriptions Obtained from Clustering," Systems and Computers in Japan, vol. 24, No. 11, 1993.

Tan et al., "A Cost Minimization Approach to Edge Detection Using Simulated Annealing," IEEE Transactions on Pattern Analysis and Machine Intelligence, vol. 14, No. 1, Jan. 1991.

Bhandarkar et al., "Image Segmentation Using Evolutionary Computation," IEEE Transactions on Evolutionary Computation, vol. 3, No. 1, Apr. 1999.

Lundervold et al., "Segmentation of Brain Parenchyma and Cerebrospinal Fluid in Multispectral Magnetic Resonance Images," IEEE Transactions on Medical Imaging, vol. 14, No. 2, Jun. 1995.

* cited by examiner

METHOD AND APPARATUS FOR DETERMINING A REGION IN AN IMAGE BASED ON A USER INPUT

CROSS REFERENCE TO RELATED APPLICATIONS

The present application is a continuation application under 37 CFR §1.53(b) of U.S. patent application Ser. No. 09/564,905, filed May 4, 2000 now abandoned.

FIELD OF THE INVENTION

The present invention relates to the fields of image processing and computer vision, and more particularly, to methods and apparatus for determining an arbitrary region in an image based on a specification provided by a user, as well as the color and texture information in the image.

BACKGROUND OF THE INVENTION

Within the fields of computer vision and image processing, a number of techniques have been proposed or suggested for performing image segmentation. Image segmentation techniques typically segment an entire image into distinct regions, such that every pixel in the original image belongs to a connected region in the segmented image. For a general discussion of image segmentation methods, see, for example, N. R. Pal & S. K. Pal, "A Review of Image Segmentation Techniques," Pattern Recognition, Vol. 26, No. 9, 1277–94 (1993), incorporated by reference herein. Typically, segmentation methods perform global optimization such that each region is maximally homogeneous based on image attributes such as color, texture and brightness and such that region boundaries lie as much as possible along edges. Top down methods that perform global segmentation may be based on a "split and merge" paradigm. Bottom up methods, on the other hand, are typically based on "region growing." Region growing techniques often involve an initial location in the image, called a seed, where the region growing begins. Conventional segmentation techniques, however, do not rely on initial boundary information provided by the user.

In addition to general image segmentation techniques, a number of techniques have been proposed or suggested for determining a contour or boundary from an image given a set of input points. The pioneer work in this area is based on a variational approach in which a cost function composed of image and contour forces is minimized This work is often referred to as the "active contour" model or more graphically, as "snakes." The image forces are typically based on gradient information and the contour forces are computed from constraints such as smoothness and elasticity. In the active contour model, the input is a number of fairly accurate points and the desired result is a contour fitted to the image passing near these points. For a more detailed discussion of the active contour model, see, for example, M. Kass et al., "Snakes: Active Contour Models," IEEE Proc. Int'l Conf. Computer Vision, ICCV87, 259–268 (London 1987); S. C. Zhu & A. Yuille, "Region Competition: Unifying Snakes, Region Growing, and Bayes/MDL for Multiband Image Segmentation," IEEE Trans. on Pattern Analysis and Machine Intelligence, Vol. 18, No. 9, 884–900 (September, 1996) and M. Etoh, "Active Contour Extraction Based on Region Descriptions Obtained from Clustering," Systems and Computers in Japan, Vol. 25, No. 11, 1111–19 (1993), each incorporated by reference herein. The active contour model approach generally attempts to find a contour, rather than a closed region which best fits the user's input.

In the standard contour model, region information is not used. The resulting curve may follow maximal gradients which lie along different regional boundaries. Secondly, the input and output of the active contour is based upon a fixed number of points. Therefore, the accuracy or resolution of the result, and the associated speed of the computation, is directly dependent on the number of points. As a variational approach, energy values result from integrating along the entire contour; every part of the solution is dependent on the entire configuration. This becomes an expensive procedure that employs matrix computations that are more cumbersome as the complexity of the energy function increases. Another limitation of the active contour method is the use of constraints on the smoothness or elasticity of the curve. The smoothness is assumed to be known a priori. The results of the active contour method depend on the values of the smoothness or elasticity constraints.

The use of simulated annealing as an optimization process in image processing and computer vision is widespread. For example, H. L. Tan et al., "A Cost Minimization Approach to Edge Detection Using Simulated Annealing," IEEE Trans. on Pattern Analysis and Machine Intelligence, Vol. 14, No. 1, 3–18 (January, 1991), incorporated by reference herein, discloses an edge detection method using simulated annealing. Likewise, S. M. Bhandarkar & H. Zhang, "Image Segmentation Using Evolutionary Computation," IEEE Trans. on Evolutionary Computation, Vol. 3, No. 1, 1–21 (April 1999), incorporated by reference herein, discloses a global image segmentation method using simulated annealing.

These simulated annealing methods, however, do not find a single region based on an input from a user. Rather, they identify more global solutions to edge detection and image segmentation. A. Lundervold & G. Storvik, "Segmentation of Brain Parenchyma and Cerebrospinal Fluid in Multispectral Magnetic Resonance Images," IEEE Trans. on Medical Imaging, Vol. 14, No. 2, 339–349 (June, 1995), incorporated by reference herein, discloses a methodology to match medical image information to an atlas. In this work, models of specific a priori information are used to solve the task. For example, the number of tissues to identify is known, as well as some of the statistical differences in tissue types. This methodology is applicable only where information regarding the domain is available.

The optimization may also be implemented using a genetic algorithm, as described, for example, in M. Gudmunddsson et al., "Edge Detection in Medical Images Using a Genetic Algorithm," IEEE Trans. on Medical Imaging, Vol. 17, No. 3, 469–474 (June 1998), incorporated by reference herein. In addition, S. Cagnoni et al., "Interactive Segmentation of Multi-Dimensional Medical Data with Contour-Based Application of Genetic Algorithms," IEEE (1994), incorporated by reference herein, discloses a genetic approach to semi-automatically segment medical images. These genetic approaches utilize two or more user-supplied two-dimension training samples to segment the region of interest in three-dimensions. One sample is used as seed information and the other samples are used to evaluate the fitness function. The fitness function, however, does not use region information. Rather, the fitness function is based on connectivity, edge similarity and proximity. New edge points are found using a genetically evolving detector. The result of the genetic approaches is a set of points that do not necessarily define a connected boundary. To obtain a connected boundary or boundaries requires a later stage to perform interpolation and contour extraction. For the latter, the genetic approaches propose a differential elastic model.

Global segmentation methods mark every pixel in an image as a member of one of a finite number of different connected regions. Generally, global segmentation methods are fully automatic and do not rely on user input. In some instances of region growing, a seed point (a single location) is specified by the user. In a few cases, users interactively specify contour information but in each of these cases, their final objective differs. In A. Lundervold & G. Storvik, referenced above, the objective is to segment a specific type of medical image based on a model. In S. Cagnoni et al., referenced above, the objective is to use two dimension information to detect edge contours in three dimensions based only on edge information.

Contour or boundary detection methods attempt to find an optimal boundary based on image and user information. Contour or boundary detection methods typically do not use region information and are generally based on the initial information of a fixed set of vertices. In addition, assumptions concerning the smoothness, elasticity, or rigidity of the contour are often an important aspect of these methods. The solution depends on the values of these constraints. When smoothness, elasticity, or rigidity of the contour are not known a priori, or if one or more of these value change along different portions of the boundary, then the wrong solution is found. When a variational approach is applied, the method becomes more costly as the number of points increases.

A need therefore exists for methods and apparatus that identify a region in an image using a set of ordered points, i.e., samples from a continuous contour, to derive a unique connected region. A further need exists for methods and apparatus that identify a region in an image using a set of ordered points to perform single region identification based on both edge and region information. A need exists for methods and apparatus that identify a region in an image by applying simulated annealing techniques to single region detection based on a user input (or prior information) of an initial estimate of the region. A further need exists for methods and apparatus that identify a region in an image by combining proximity to an initial estimate of the region of interest, with a measure of region dissimilarity for evaluating the cost function to be optimized for region identification. Yet another need exists for methods and apparatus that identify a region in an image using a set of configuration changes to be evaluated by an optimization process based on various sized incremental growths of a single region.

SUMMARY OF THE INVENTION

Generally, methods and apparatus are disclosed for identifying a particular region in an image based on a user specification and information in the image, such as color and texture information. A new semiautomatic color segmentation scheme is disclosed that uses both color and edge information. Initially, the user specifies a region using a single closed contour, that is potentially visually complex, composed of different colors, textures and sub-regions. For example, the region could be an eye, a hand, or a partially shaded object. The user input specifies the region of interest in the image. The present invention thereafter identifies a region that is (i) near the user input; (ii) about the same size as the initial region; (iii) the most likely boundary based on proximity to the initial boundary, region dissimilarity across the boundary, and similarity in region change along the boundary; and (iv) includes all points of homogeneous sub-regions that are initially mostly included.

Unlike conventional automatic techniques that do not know the region that is of interest to the user, the present invention allows a user to identify an arbitrary but particular region. The present invention identifies the region accurately segmented and appropriately measured. By using local color information, edge information, and the user input, the present invention is capable of segmenting extremely complex regions including regions with highly irregular contours and regions composed of several visually different sub-regions or textures, or both. The present invention has a range of applications, including image sub-selection in graphic arts and as an input mechanism for training samples in industrial tracking.

A more complete understanding of the present invention, as well as further features and advantages of the present invention, will be obtained by reference to the following detailed description and drawings.

DETAILED DESCRIPTION OF PREFERRED EMBODIMENTS

Figure 1:
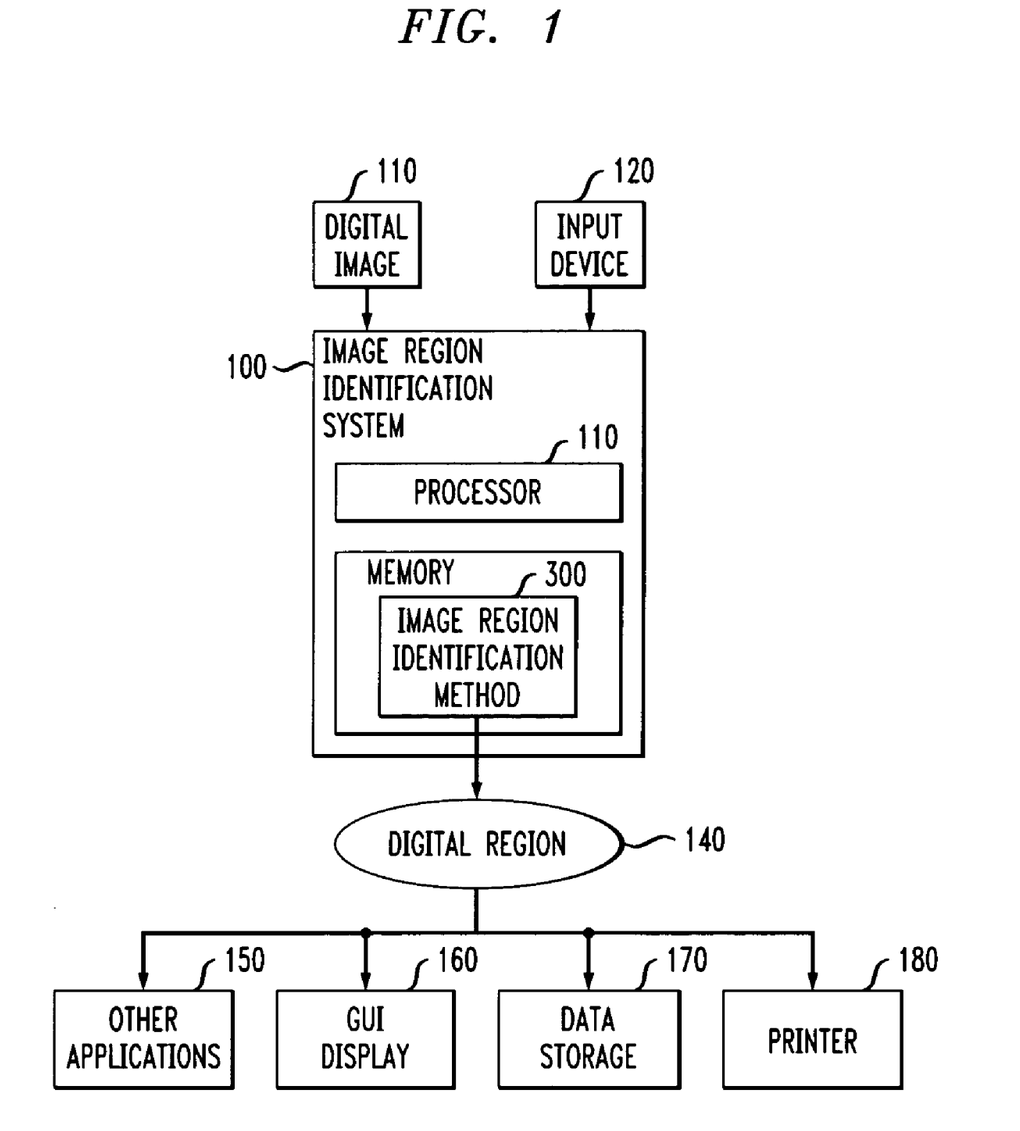
FIG. 1 is a block diagram of one embodiment of the present invention.

FIG. 1 illustrates an image region identification system 100 in accordance with the present invention. The image region identification system 100 determines a single closed region in an image 110 based on a user input. The user initially draws a contour around the region of interest. The image region identification system 100 uses the user input to create an initial single closed region. Based on the single closed region, the image region identification system 100 computes a distance map, a region-based color histogram and the color gradient of the image 110. This information is combined using simulated annealing to optimally determine the region that (i) is a single connected region whose area is similar to the user input; (ii) has a final boundary relatively near the original boundary (the majority of original pixels are in the final region); (iii) has a final boundary lying along points of high region dissimilarity; (iv) has homogeneous sub-regions that are initially mostly included in the final region; and (v) has a boundary lying along points of similar gradient directionality.

As shown in FIG. 1, a digital image 110 is displayed and the user supplies an input using an input device 120, such as a keyboard or mouse. The user input may be implemented, for example, by drawing a contour on the image 110 in the display. The user drawing and the image 110 are inputs to the image region identification system 100 which may be embodied, for example, as a general-purpose computer. The image region identification system 100 determines a single connected region 140 of the image 110 which is then output either to another application 150, a display 160, a storage device 170 or a printer 180.

The image region identification system 100 includes a processor 110 and related memory, such as a data storage device, which may be distributed or local. The processor 110 may be embodied as a single processor, or a number of local or distributed processors operating in parallel. The data storage device and/or a read only memory (ROM) are operable to store one or more instructions, which the processor 110 is operable to retrieve, interpret and execute.

Figure 2A:
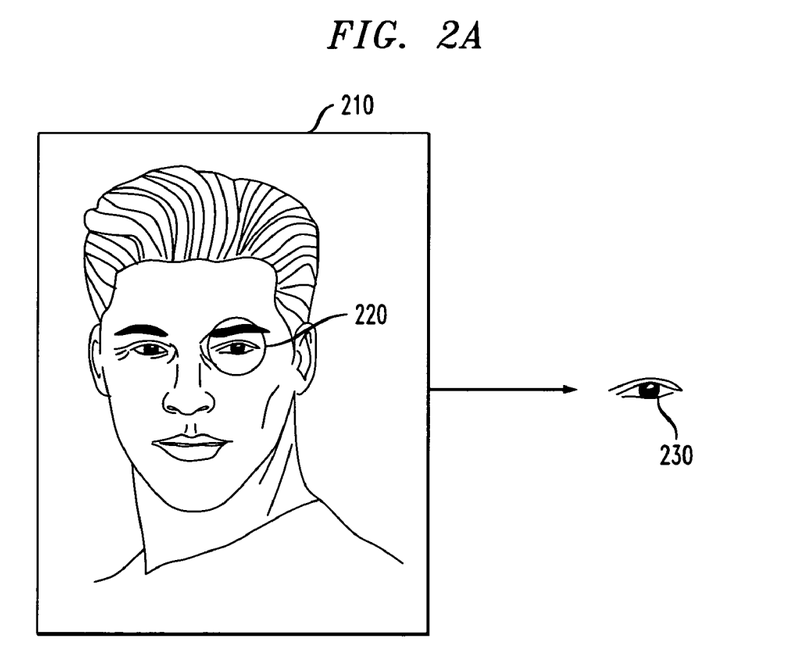
FIGS. 2A and 2B illustrate the identification of a region of interest in an image based on a user input in accordance with the present invention.

FIG. 2A illustrates the identification of a region of interest in an image 210 of a person, based on a user input 220. The user input 220 comprises an approximate outline of the eye. The user input 220 is not an accurate representation of the region of interest (the eye) and the user is requesting a more accurate segmentation of the image based on the user input information and the information in the image. The desired output 230 is the exact delineation of the eye in which the portions of the eye which are included depend on how the user has initialized the system. If the user did not include a majority of the eyelid, then the output should not include the eyelid and vice versa. The user is a necessary part of such a segmentation since only the user knows exactly what is the region of interest. On the other hand, the algorithm can help the user to carefully and accurately delineate the region the user has specified.

Figure 2B:
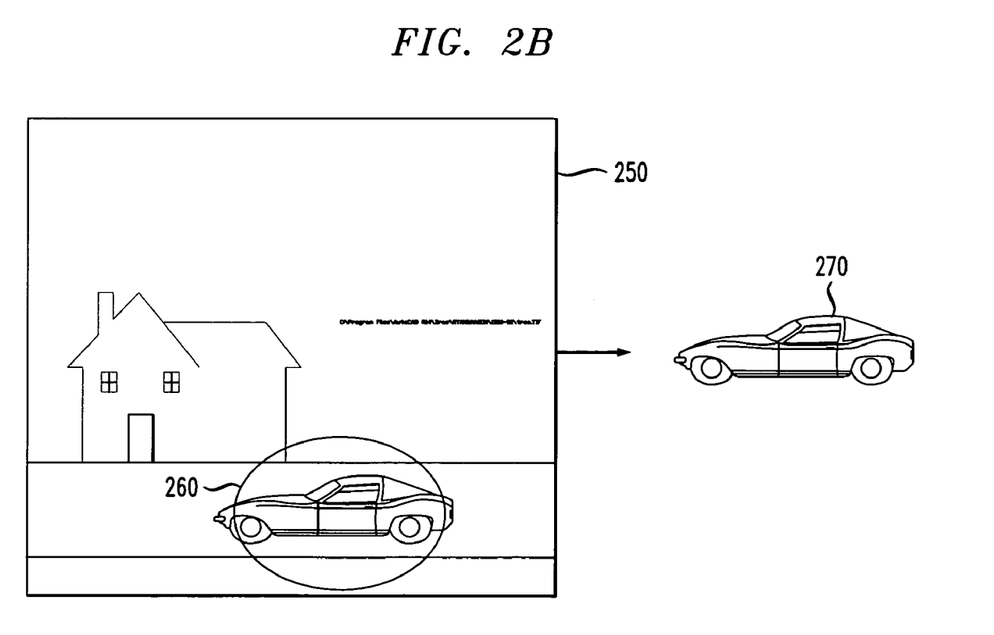

FIG. 2B illustrates the identification of another region of interest in an image 250 of a car on a road in front of a house, based on a user input 260. The user input 260 comprises an approximate outline of a car. The user input 260 is not an accurate representation of the region of interest (the car) and the user is requesting a more accurate segmentation of the image based on the user input information and the information in the image. In the example of FIG. 2B, the user selects the car, including the tires and windows although small bits of the background are included and parts of the tire and car body are excluded. The optimal region 270 segmented by the algorithm is the entire car without bits of the background.

Figure 3:
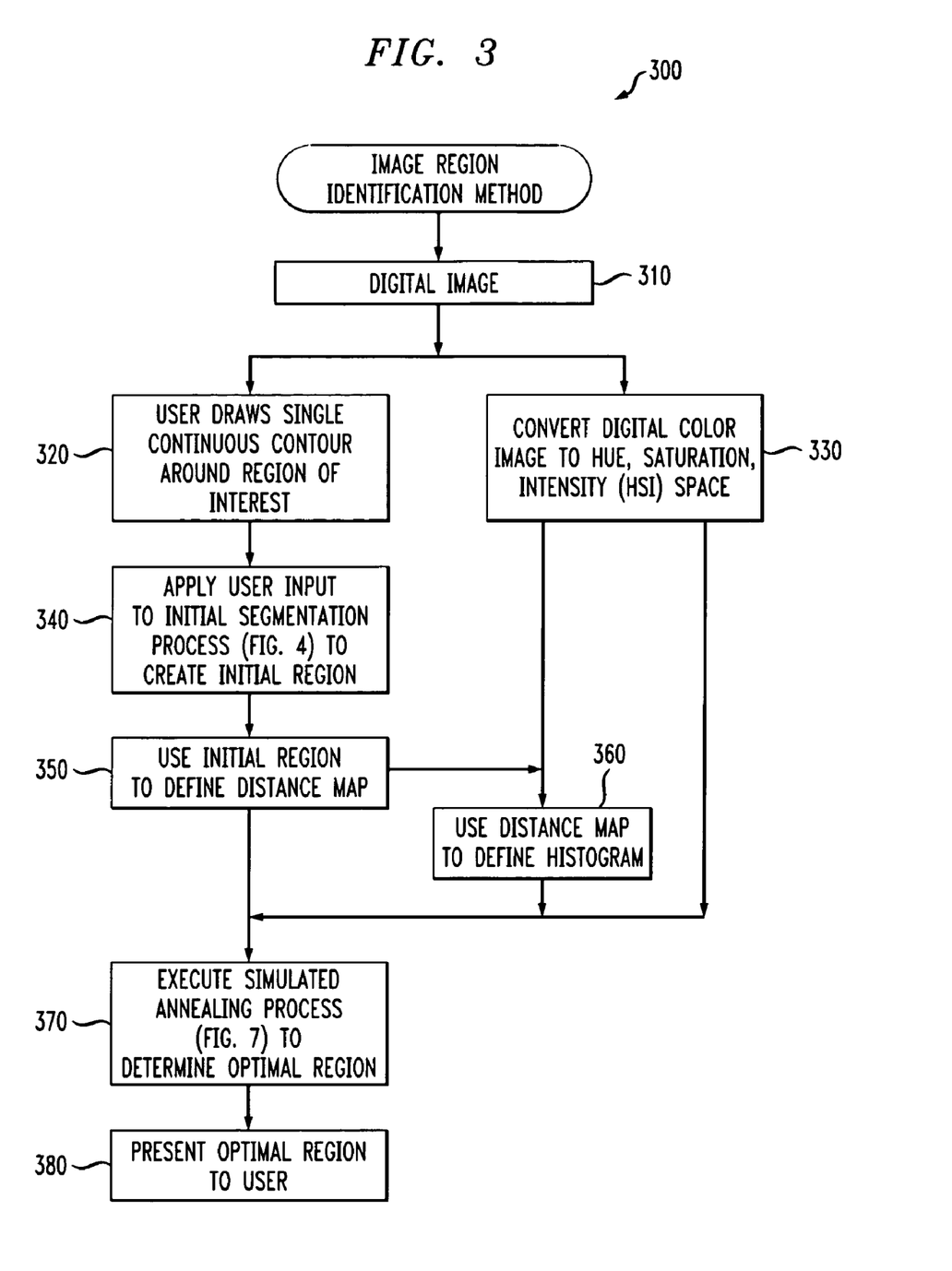
FIG. 3 is a flow chart describing a method performed by the computer of FIG. 1 to identify a region of interest in an image based on a user input in accordance with the present invention.

FIG. 3 is a flow chart describing an image region identification method 300 performed by the computer of FIG. 1 to identify a region of interest in an image based on a user input in accordance with the present invention. As shown in FIG. 3, the digital image is initially displayed on the screen during step 310 and the user draws a single continuous contour around the region of interest during step 320. The digital color image is converted to a hue, saturation, intensity (HSI) space during step 330.

The user input received during step 320 is applied to the initial segmentation process 400, discussed further below in conjunction with FIG. 4, during step 340 to create an initial region. The initial region is guaranteed to be a single connected region. The initial region is used during step 350 to define a distance map in which points which are on the boundary of the initial region have a zero distance. The distance of any point outside the region is the Euclidean distance from this point to the nearest point in the region. The distance of any point inside the region is similarly the negative Euclidean distance from this point to the nearest point along the boundary of the region. For a more detailed discussion of the generation of a distance map, see, for example, P. Danielsson, "Euclidean Distance Mapping," IEEE Computer Graphics and Image Processing, Vol 14, 227–248 (1980), incorporated by reference herein.

The distance map produced during step 350 is used to define a histogram during step 360 based only on the points inside the region and weighted with points which are more internal. This histogram may be quantized in the hue/saturation values and each pixel added may also add to a Gaussian neighborhood around this hue/saturation value to allow for small variations. The distance map produced during step 350, the histogram produced during step 360 and the HSI image produced during step 330 are applied to a simulated annealing process 700, discussed further below in conjunction with FIG. 7, during step 370. Generally, the simulated annealing process 700 determines an optimal region that is presented to the user (or another application) during step 380.

Figure 4:
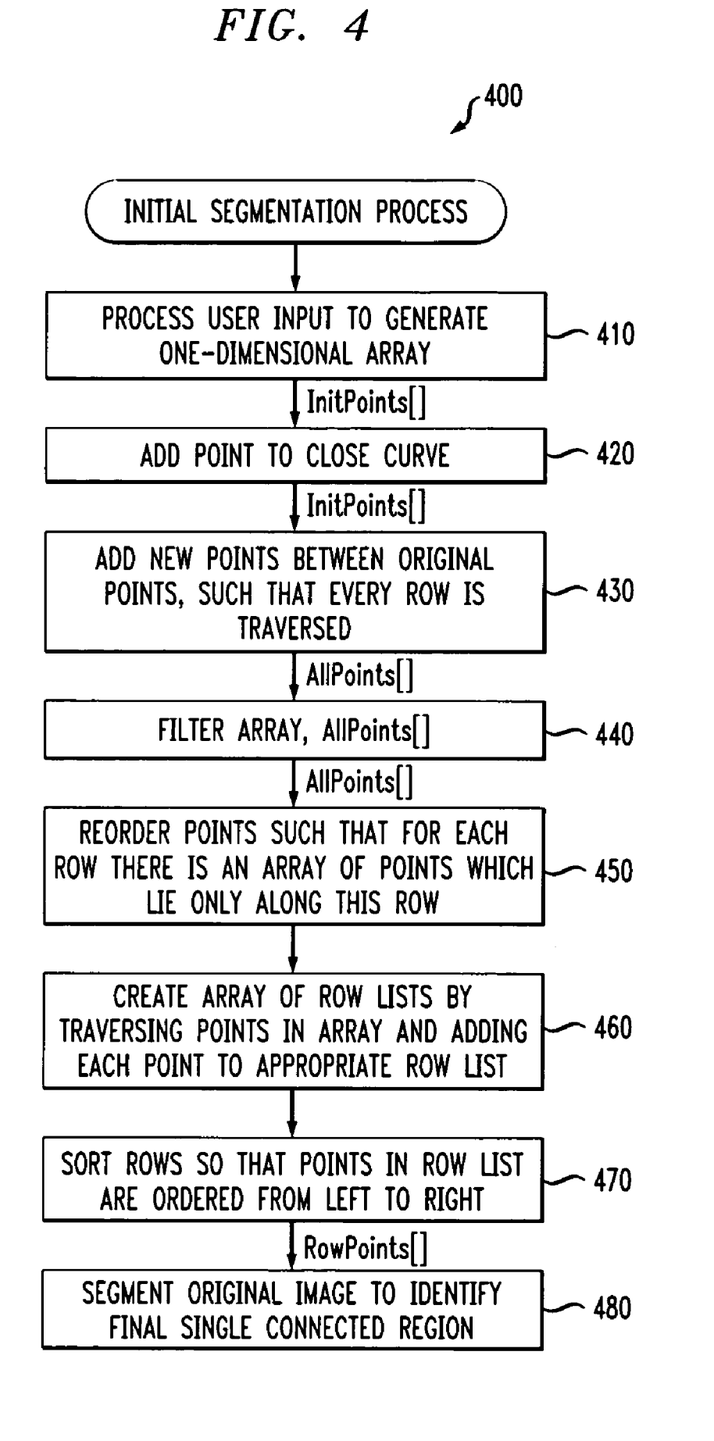
FIG. 4 is a flow chart describing the initial segmentation process of FIG. 3 in further detail.

As previously indicated, the image region identification method 300 executes an initial segmentation process 400, shown in FIG. 4, to process the user input and create an initial region. It is noted that the user input is an ordered set of points that were sampled from the contour the user drew around the object. It is assumed that this set of points is a continuous outline of the object, i.e., these points can be followed, from one to another to draw a single continuous polygonal curve.

As shown in FIG. 4, the user input is initially processed during step 410 to generate a one-dimensional array, referred to as InitPoints[ ]. An additional point which is equivalent to the first point is added to the end of this array during step 420 in order to guarantee that the curve is closed. These points are then used during step 430 to create a new array in which new points are added between the original points such that every row of the original image is traversed, using bilinear interpolation. The array produced by step 430 is referred to as AllPoints[ ].

The array, AllPoints[ ], is then filtered during step 440 in the following manner. First, consecutive redundant points are removed. Then, all but the first of any consecutive points which lie along the same row are removed. Finally, any point which is a peak, i.e, a local maximum or minimum in column height is removed. To do this, the first derivative is evaluated and peaks (but not inflection points) are removed. The points are filtered in this manner, because after removing consecutive points along the same row, some points will become zero derivative points.

Thereafter, the points are reordered during step 450, such that for each row there is an array of points which lie only along this row. An array of row lists is then created during step 460, by traversing the points in the array, AllPoints, and adding each point to the row list to which it belongs. Each row is then sorted during step 470 so that points in each row list are ordered from left to right in the image, i.e, in scan order, to create an array of lists, referred to as RowPoints[ ].

Finally, the original image is segmented during step 480 to identify the final single connected region specified by the user's points, by traversing each row list using a scan-line filling process as follows. First, all rows without points are not included in the final region. For each row list, all points preceding the first point in the list are not included in the final region. Starting at the first point, all points are included until the next point is reached. All points after the second point are excluded until the next point is reached, continuing by alternating inclusion until the row is entirely traversed. The final region is then specified by a binary image in which each point that is included is set, while each point not included is not set. The region identified by this process is a single 8-connected region which may have holes and is arbitrarily complex.

FIG. 5 illustrates the identification of a region of interest in an image by the initial segmentation process 400 of FIG. 4 based on a user input. FIG. 5A shows a closed continuous contour 510 specified by the user. FIG. 5B shows the zero derivative points. Points A and B in FIG. 5B are removed because they are peaks (during the filtering performed during step 440). Point C is not removed because it is an inflection point. Points E and F are also removed because they lie along the same row as D. Finally, point D is removed because it is a peak point, after the removal of E and F.

Figure 5A:
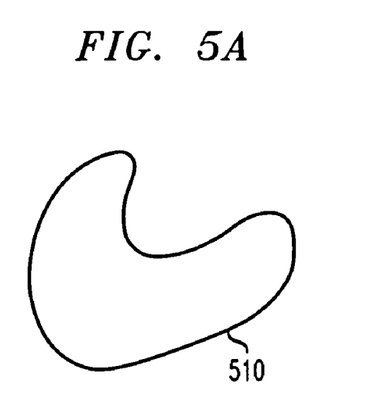
FIGS. 5 and 6 illustrate the identification of a region of interest in images by the initial segmentation process of FIG. 4 based on a user input.
Figure 5B:
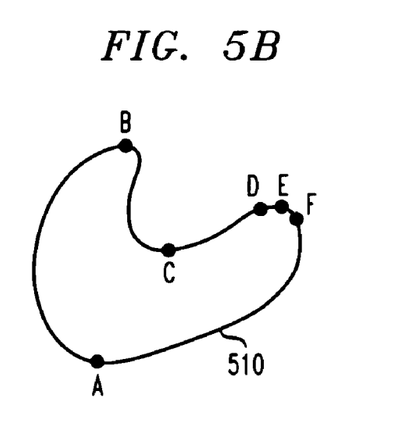
Figure 5C:
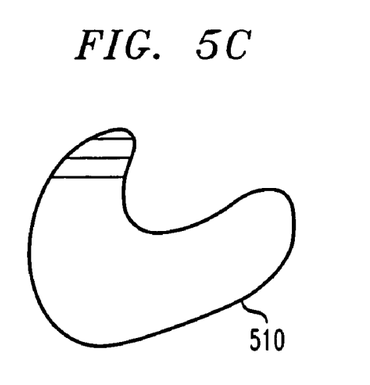
Figure 5D:
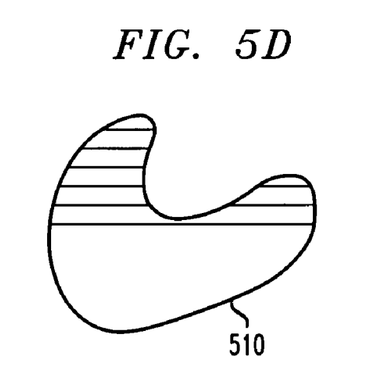
Figure 5E:
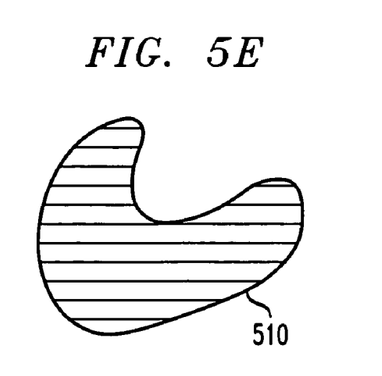

FIG. 5C shows the scan-line filling process described above in conjunction with step 480, in which each row is traversed marking interior points which are between two points on the contour. FIG. 5D shows more scan-line filling in the more complex cases in which each row has several contour points and the process alternates between including and excluding points. FIG. 5D also shows why peak points are removed so that the appropriate region is identified. FIG. 5E shows the final region segmented by the initial segmentation process 400.

Figure 6A:
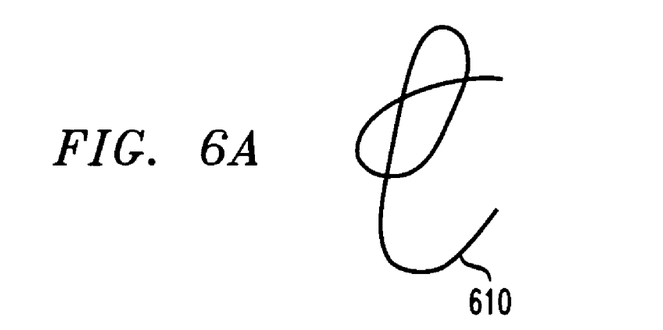
Figure 6B:
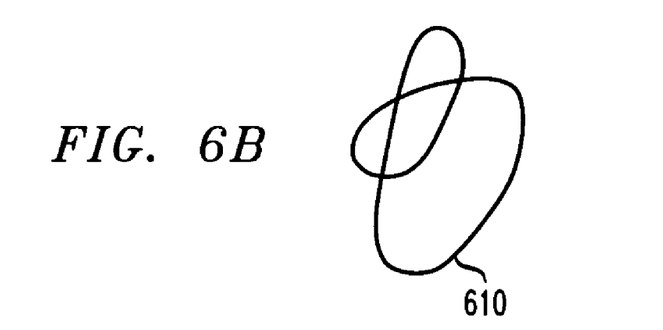
Figure 6C:
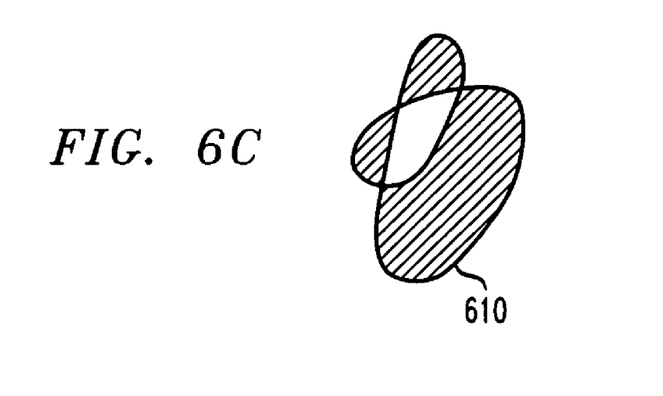

FIG. 6 illustrates the identification of a region of interest in an image by the initial segmentation process 400 of FIG. 4 based on a more complex example of a user's input 610. In FIG. 6A, the initial contour 610 drawn by the user is shown. FIG. 6B shows the contour closed (during step 420; FIG. 4). FIG. 6C shows the final segmentation into a single 8-connected region based on the initial segmentation process 400.

Figure 7:
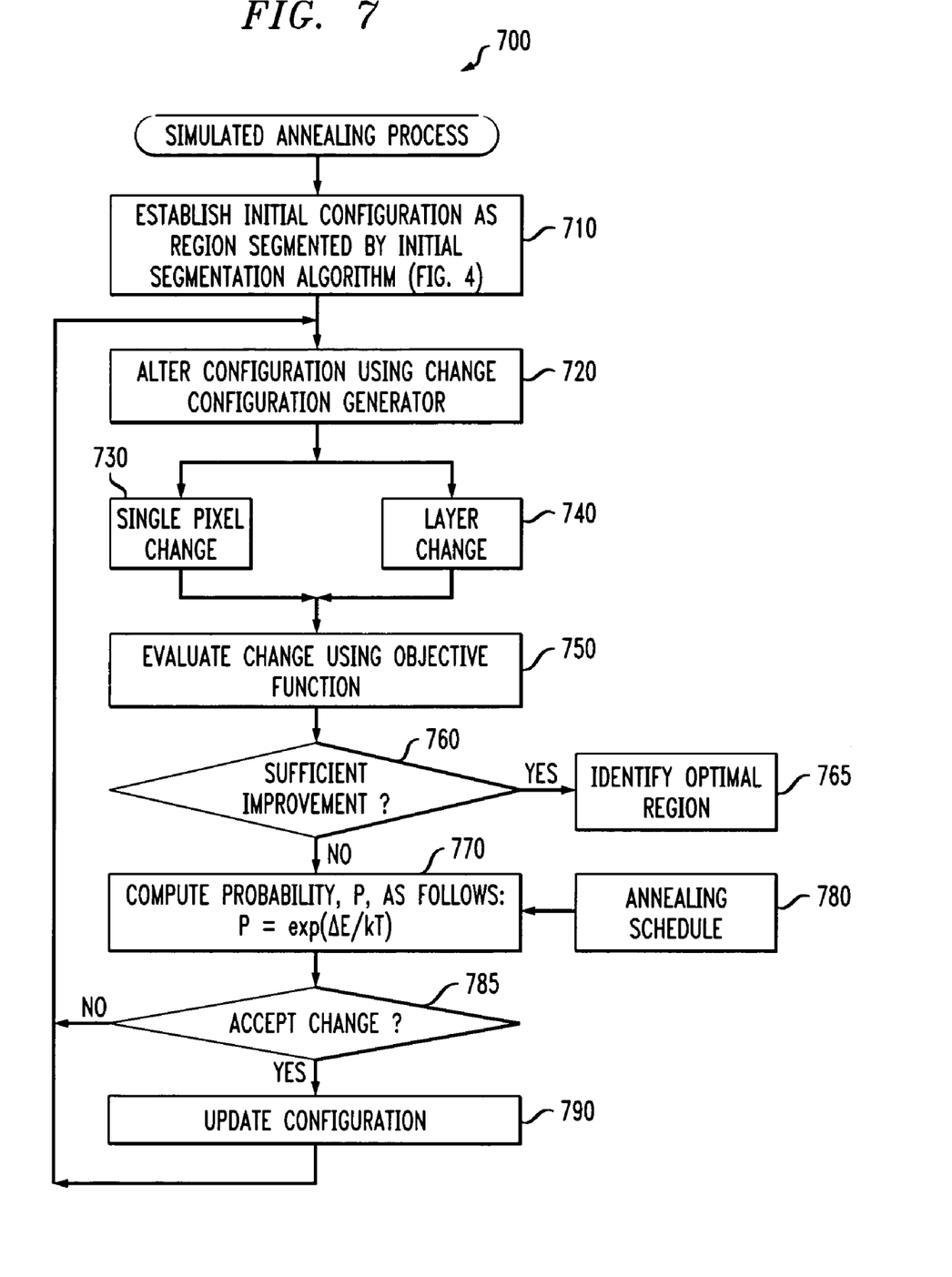
FIG. 7 is a flow chart describing the simulated annealing process of FIG. 3 in further detail.

As previously indicated, the image region identification method 300 executes the simulated annealing process 700, shown in FIG. 7, to process the distance map, histogram and HSI image to determine an optimal region. As shown in FIG. 7, the initial configuration is established during step 710 as the region segmented by the initial segmentation algorithm 400 (based on the user's input, as discussed above in conjunction with FIG. 4). To implement this, the information is represented in two ways: (1) as a binary two dimensional image array represented by the segmented region, and (2) as a list of boundary points. The binary image representation will also store other information about each pixel. This configuration is altered by the change configuration generator during step 720. Two primary types of changes can occur.

The first type of change is a single pixel change during step 730. In this case, a single pixel can be added or deleted. The change generator selects a point on the boundary, P. This point, P, can be deleted except under the following conditions. If deleting this point changes two pixels in the 3×3 (or 5×5) window centered at P that were connected, so they are no longer connected, then we do not allow P to be deleted. This constraint is imposed in order to ensure that the configuration change generator does not create more than one final region. Similarly, a point can be added which is adjacent to point P, if it is not yet in the region and it is possible to delete this point on the next change specified by the generator. This constraint is added so that all changes to the configuration are equally likely. This is an important requirement that must be satisfied so that the search space is explored appropriately by the simulated annealing.

The second type of change created by the configuration change generator is a layer change during step 740. In this case, a layer is added or removed from a portion of the boundary of the region. This allows the simulated annealing process to take some jumps to more likely candidates. To add a layer, three (3) (or any small number of) adjacent points are taken along the boundary. For each point, all adjacent non-region pixels are added using the same constraint about removal as before. Similarly, to delete a layer, three (3) connected points are taken along the boundary and then removed. Again, a point is not deleted if it disconnects neighboring points. To take larger jumps, the change generator can perform multiple layer adding or deleting.

After the configuration change generator updates the current region, the change is evaluated during step 750 using an objective function, discussed below. The cost evaluation is based on the change to the boundary of the region. The change associated with each pixel that is added to the boundary and each pixel which is removed is evaluated. It is noted that when a pixel is added, invariably another pixel which was on the boundary is no longer on the boundary. Similarly, when a pixel is deleted, one or more new pixels may now be on the boundary. Hence, the change to the cost function is the sum of the changes of each pixel which was altered in this step. The details of how it is determined which pixels to add or remove from the boundary based on a pixel or layer change are discussed below in conjunction with step 790.

The objective function, E, to be minimized, is composed of 5 weighted terms:

$$E = w_1 E_A + w_2 E_D + w_3 E_H + w_4 E_G + w_5 E_S.$$

where $w_1, w_2, \ldots, w_5$ are the weights and $E_A, E_D, E_H, E_G,$ and $E_S$ are the area, distance map, region histogram, gradient and gradient similarity energy terms, respectively. The area term, $E_A$, reflects how the area of the region given by the current configuration differs from the original area indicated by the user. For the area term, $E_A$, small differences are ignored and only large changes are penalized, where the larger the change, the bigger the penalty. The normalized difference of the current area, $A_c$, to the original area, $A_o$, is computed and a quadratic weighting function, F, is applied, as follows:

$$E_A = F((A_c - A_o)/A_o).$$

The distance map term, $E_D$, reflects the overall distance which the current boundary has deflected from the original boundary. For each pixel on the boundary, the quadratically weighted cost of its absolute distance from the original boundary is computed using the distance map computed during step 350. Again, no penalty is made for small distances and a heavier penalty is applied as a point moves very far way. The distance map term is the average weighted distance for each point on the boundary.

The region histogram energy term, $E_H$, reflects the degree to which the pixels included in the region of the current configuration improve or disturb the original histogram. If a pixel is added to the original region, its likelihood of belonging to the region specified by the user is assessed. The probability is greatest if it falls on, or near, a color value with a large histogram value. Similarly, if the pixel falls far from any color value which is represented in the original histogram, the probability is low. If the pixel falls on a color value only sparsely represented, it is neutral. In this way, nearby pixels of the same or similar color to the original region are good candidates to add, pixels of questionable colors are added or not based on other criteria.

The fourth energy term, $E_G$, adds a cost based on the extent to which the boundary points lie along a strong gradient. For each point on the boundary, the gradient is measured in the direction normal to the boundary. The gradient term is the inverse of the average gradient for all points on the boundary. The gradient may be computed as the magnitude of the color difference or it may be computed from the difference in the probabilistic likelihood between the pixels on each side of the boundary. By using the latter metric, particular differences in color changes are not differentiated. This is useful, since the true boundary is not necessarily the strongest color change, but the local consistent one.

The last term is the gradient similarity term, $E_S$. The gradient similarity term, $E_S$, is added to decrease the likelihood that the contour moves from one boundary to a different boundary. For this term the average difference in the gradient direction is computed along contiguous boundary points.

The objective function is computed by updating the current value based on the pixels that were added or removed from the configuration change generator during step 720. This change in the energy is used to compute the probability, P, during step 770 based on the Boltzmann probability distribution as follows:

$$P=\exp(\Delta E/kT)$$

where T is the temperature, $\Delta E$ is the change in energy, and k is Botzmanns' constant. The temperature is determined by an annealing schedule during step 780. The configuration change is accepted during step 785 if a random sample satisfies the probability threshold set by the change in energy during step 780. If the configuration change is accepted, the current configuration is updated during step 790.

The configuration is updated during step 790 as follows. If a single pixel is added, then all adjacent region pixels are checked to see if any pixels that are on the boundary are no longer on the boundary. If a pixel is no longer on the boundary, it is removed from the boundary list, and unmarked as a boundary point in the image array. It is noted, however, that only points from the boundary are removed, not the region, so constraints regarding disconnecting the region are not an issue.

If a single pixel is deleted, then all adjacent region pixels are checked to see if any pixels that were not on the boundary are now on the boundary. If a pixel is now on the boundary, it is added to the boundary list at the place where the original pixel was deleted, and the pixel is also marked as a boundary point in the image array.

If a layer is added, for each pixel added, the configuration is updated before adding another pixel. In this manner, pixels are not added to points which are no longer on the boundary. Similarly, if a layer is deleted, for each pixel deleted, the configuration is updated before deleting another pixel. Any pixels that are added, are added to the list at the point where the pixel was deleted. The pixel following these pixels is used as the next pixel to be removed in the layer. This results in a pixel-wide layer along the boundary to be deleted.

After the configuration is updated during step 790, program control returns to step 720 and continues in the manner described above. The congifuration change generator supplies a new configuration to be tested by the system during step 720. A test is performed during step 760 to determine whether insufficient improvement has occurred over a required number of tests. If it is determined during step 760 that insufficient improvement has occurred over a required number of tests, the process is complete and the current configuration is returned as the optimal region during step 765.

It is to be understood that the embodiments and variations shown and described herein are merely illustrative of the principles of this invention and that various modifications may be implemented by those skilled in the art without departing from the scope and spirit of the invention.

What is claimed is:

1. A method for identifying an arbitrary connected final region in an image, said image comprised of a plurality of pixels, said method comprising the steps of:
   receiving a user input indicating a preliminary region of interest in said image; and
   processing said image and said preliminary region of interest to determine which of said pixels to include in said particular final region in said image by evaluating an objective function until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

2. The method of claim 1, wherein one of said weighted characteristics is an area of a region of said image.

3. The method of claim 1, wherein one of said weighted characteristics is a distance map of a region of said image.

4. The method of claim 1, wherein one of said weighted characteristics is a region histogram of a region of said image.

5. The method of claim 1, wherein one of said weighted characteristics is a gradient of a region of said image.

6. The method of claim 1, wherein one of said weighted characteristics are gradient similarity energy terms of a region of said image.

7. The method of claim 1, wherein said objective function evaluates the properties of the region represented by the iteratively updated boundary.

8. The method of claim 1, wherein said objective function evaluates the properties of the edge and region represented by the iteratively updated boundary.

9. The method of claim 1, wherein said extent of deviation between said particular region and said preliminary region of interest is based upon the relative difference in area between said particular region and said preliminary region of interest.

10. The method of claim 1, wherein said extent of deviation between said particular region and said preliminary region of interest is based upon a distance map that measures the overall boundary of said particular region differs from an overall boundary of said preliminary region of interest.

11. The method of claim 1, wherein said objective function measures the degree to which a given pixel included in said final region improves a histogram associated with said preliminary region.

12. The method of claim 1, wherein said objective function measures the degree to which a boundary in said final region lies along a strong gradient.

13. The method of claim 1, wherein said objective function measures the degree to which a contour in said final region moves from one boundary to another boundary.

14. The method of claim 1, wherein said objective function is defined as follows:

$$E=w_1E_A+w_2E_D+w_3E_H+w_4E_G+w_5E_S$$

where $w_1, w_2 \ldots, w_5$ are weight values and $E_A, E_D, E_H, E_G$, and $E_S$ are area, distance map, region histogram, gradient and gradient similarity energy terms.

15. The method of claim 1, wherein a single pixel, P1, along a boundary in said image can be deleted from said final region unless deleting said pixel, P1, disconnects two pixels in a window surrounding said pixel, P1, that were connected before said deletion.

16. The method of claim 15, wherein a single pixel, P2, along a boundary in said image can be added to said particular region provided said pixel, P2, is adjacent pixel, P1, said pixel, P2, is not yet in said final region and said pixel, P2, can be subsequently deleted.

17. The method of claim 1, wherein a layer of pixels in said image is added to said particular region by selecting a number of adjacent points along a boundary in said final region and adding all adjacent pixels not in said particular region provided.

18. The method of claim 1, wherein a layer of pixels in said image is removed from said particular region by selecting and removing a number of adjacent points along a boundary in said particular region provided such removal does not disconnect neighboring points.

19. The method of claim 1, wherein said user input is a single closed contour.

20. A method for identifying an arbitrary connected final region in an image, said image comprised of a plurality of pixels, said method comprising the steps of:
receiving a user input indicating a preliminary region of interest in said image; and
processing region and edge information in said image and said preliminary region of interest using an objective function to iteratively identify said final region until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

21. The method of claim 20, wherein one of said weighted characteristics is an area of a region of said image.

22. The method of claim 20, wherein one of said weighted characteristics is a distance map of a region of said image.

23. The method of claim 20, wherein one of said weighted characteristics is a region histogram of a region of said image.

24. The method of claim 20, wherein one of said weighted characteristics is a gradient of a region of said image.

25. The method of claim 20, wherein one of said weighted characteristics are gradient similarity energy terms of a region of said image.

26. The method of claim 20, wherein said objective function evaluates the properties of the region represented by an iteratively updated boundary.

27. The method of claim 20, wherein said objective function evaluates the properties of the edge and region represented by an iteratively updated boundary.

28. The method of claim 20, wherein said extent of deviation between said particular region and said preliminary region of interest is based upon the relative difference in area between said particular region and said preliminary region of interest.

29. The method of claim 20, wherein said extent of deviation between said particular region and said preliminary region of interest is based upon a distance map that measures the overall boundary of said particular region differs from an overall boundary of said preliminary region of interest.

30. The method of claim 20, wherein said objective function measures the degree to which a given pixel included in said final region improves a histogram associated with said preliminary region.

31. The method of claim 20, wherein said objective function measures the degree to which a boundary in said final region lies along a strong gradient.

32. The method of claim 20, wherein said objective function measures the degree to which a contour in said final region moves from one boundary to another boundary.

33. A system for identifying an arbitrary connected final region in an image, said image comprised of a plurality of pixels, said system comprising:
a memory that stores computer-readable code; and
a processor operatively coupled to said memory, said processor configured to implement said computer-readable code, said computer-readable code configured to:
receive a user input indicating a preliminary region of interest in said image; and
process said image and said preliminary region of interest to determine which of said pixels to include in said particular final region in said image by evaluating an objective function until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

34. An article of manufacture for identifying an arbitrary connected final region in an image, said image comprised of a plurality of pixels, comprising a computer readable medium storing one or more computer programs which when executed by the computer implement the steps of:
a step to receive a user input indicating a preliminary region of interest in said image; and
a step to process said image and said preliminary region of interest to determine which of said pixels to include in said particular final region in said image by evaluating an objective function until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

35. A system for identifying an arbitrary connected final region in an image, said image comprised of a plurality of pixels, said system comprising:
a memory that stores computer-readable code; and
a processor operatively coupled to said memory, said processor configured to implement said computer-readable code, said computer-readable code configured to:
receive a user input indicating a preliminary region of interest in said image; and
process region and edge information in said image and said preliminary region of interest using an objective function to iteratively identify said final region until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

36. An article of manufacture for identifying an arbitrary connected final region in an image, said image comprised of a plurality of pixels, comprising a computer readable medium storing one or more computer programs which when executed by the computer implement the steps of:
   a step to receive a user input indicating a preliminary region of interest in said image; and
   a step to process region and edge information in said image and said preliminary region of interest using an objective function to iteratively identify said final region until predefined criteria is satisfied, said objective function defined over a discrete configuration space and computed from an iteratively updated connected boundary of a single region and wherein said objective function measures an extent of deviation between said final region and said preliminary region of interest and wherein said objective function is a summation of weighted characteristics of a region of said image.

* * * * *